United States Patent Office 2,954,104
Patented Sept. 27, 196

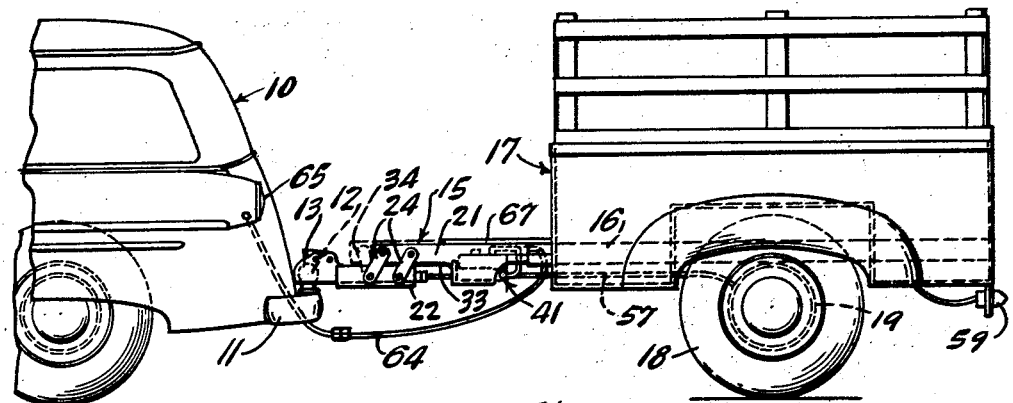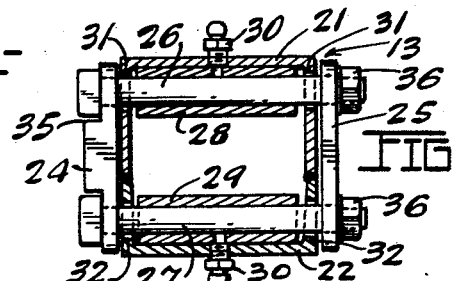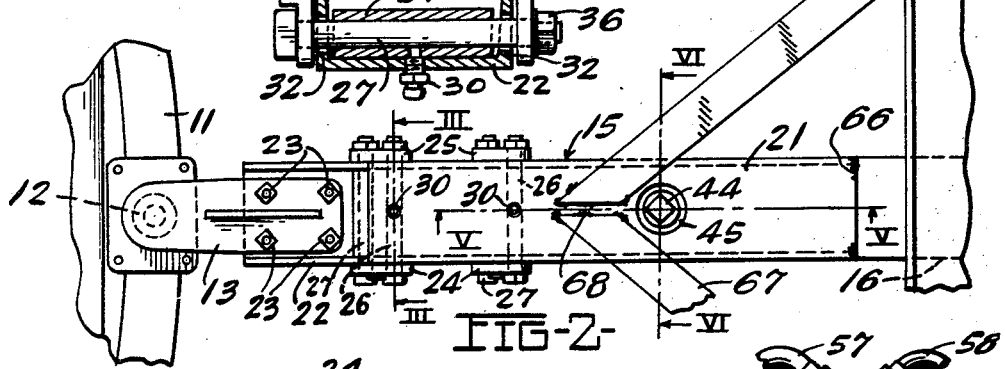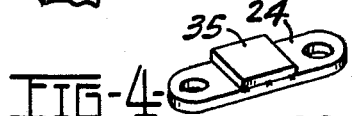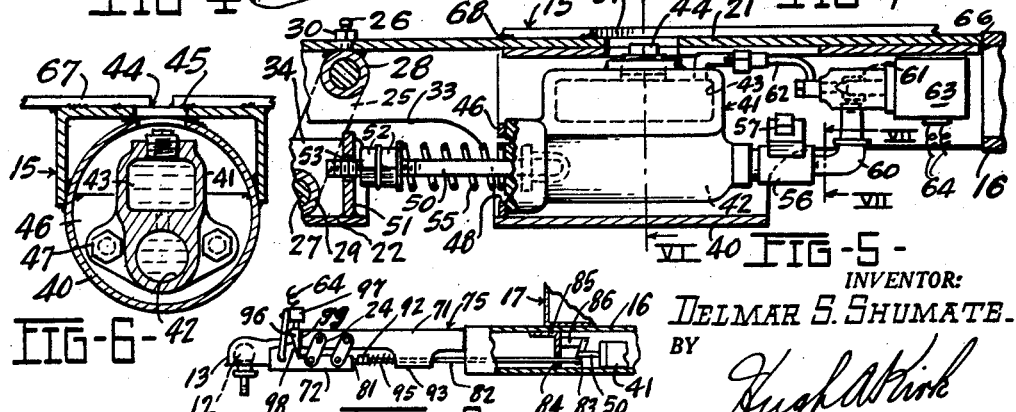

2,954,104

AUTOMATIC BRAKES FOR VEHICLE TRAILERS

Delmar S. Shumate, 317 Canal St., Toledo, Ohio

Filed Dec. 27, 1956, Ser. No. 630,897

3 Claims. (Cl. 188—112)

This invention relates to an automatic momentum operated brake for a trailer. More particularly, it deals with such an automatic brake mechanism in combination with a specific drawbar for a utility or house trailer being pulled by an automobile or tractor, including, for example, hydraulic brake mechanisms on said trailer in which the change of momentum of the trailer with respect to that of the tractor for the trailer directly operates a master cylinder for the application of the hydraulic brakes on the trailer.

It is an object of this invention to produce a simple, efficient, effective, safe and universal automatic momentum type brake for vehicle trailers.

Another object is to produce such an automatic momentum brake for trailers which can be readily rendered ineffective to permit backing of the trailer by the towing vehicle without application of the brakes on the trailer.

Another object is to produce such a brake mechanism for operating hydraulic brakes on a trailer which may be made of standard hydraulic brake parts and master cylinders now employed for automobiles, trucks and tractors.

Another object is to produce such a brake mechanism which may be installed on a trailer without modifying the hitch connection between the tractor and the trailer.

Another object is to produce such an automatic brake mechanism which will automatically apply the brakes on the trailer when the connection between the tractor or vehicle and the trailer is broken and the end of the drawbar connected to the vehicle drops and contacts the ground.

Another object is to provide such an automatic brake mechanism with means for preventing application of the brakes on the trailer when the operator of the vehicle wishes to push or back up the trailer instead of pull it, without the operator of the vehicle or tractor getting out of the vehicle.

Generally speaking, the automatic brake mechanism of this invention comprises a two-piece drawbar mounted on the trailer, which pieces or sections are parallel and spaced from each other and connected by means of transverse pivoted links to permit limited relative longitudinal or oscillating movement with respect to each other. One of the drawbar sections is anchored rigidly with the frame of the trailer and the other section is connected to the tractor or vehicle or that part of the connecting or hitch mechanism which is generally provided on the trailer drawbar for connection to the tractor or pulling vehicle, such as the socket of a ball and socket hitching joint. The mechanism for operating the brakes on the trailer is responsive to relative movement between the two sections of the drawbar; such as when the towing vehicle decelerates or stops, the trailer tends to move forward to operate the mechanism to apply the brakes on the trailer. Such a mechanism may comprise a hydraulic brake master cylinder in which the master cylinder itself may be mounted on one of the sections and the piston operated therein may be connected so as to be moved by the other section. The piston may be held by a resilient means such as a spring, in its extended or brake non-operating position and abutting against the other section. In order to prevent the operation of the brake mechanism when the vehicle is reversed to push rather than pull the trailer there may be provided a stop or wedge means inserted between the sections to prevent relative movement between them so that the piston in the hydraulic brake master cylinder cannot be operated, or this may be accomplished automatically by providing a solenoid to move said wedge or operate a by-pass valve in the duct from the hydraulic master cylinder back to by-pass the fluid pressure therefrom when the towing vehicle is put in reverse, such as by a switch connected to the reversing gear of the vehicle, or in the line with the back-up light of the vehicle, which switch may be electrically connected to said solenoid operated wedge or by-pass valve.

The above mentioned and other features and objects of this invention and the manner of attaining them will become more apparent and the invention itself will be best understood by reference to the following description of embodiments of the invention taken in conjunction with the accompanying drawing, wherein:

Fig. 1 is a side elevation of one embodiment of the brake operating mechanism of this invention embodied in the drawbar of a utility trailer connected to the rear bumper of an automobile, with the relative position between the two parallel sections of the drawbar shown in dotted lines for operation of the brakes on the trailer;

Fig. 2 is an enlarged plan view of the drawbar and connection thereof to the trailer and vehicle of the embodiment shown in Fig. 1, showing two pairs of links on each side of the drawbar for connecting its two sections together;

Fig. 3 is an enlarged vertical section taken along line III—III of Fig. 2 through one of the opposite pairs of links showing their pivoted bearings in the two sections of the drawbar;

Fig. 4 is a perspective view of one of the links shown in Fig. 3;

Fig. 5 is an enlarged vertical section taken along line V—V of Fig. 2 showing a standard hydraulic brake master cylinder, and its piston connected between the two relatively movable sections of the drawbar, and a bypass valve connected to the outlet of the master cylinder for permitting reversal or pushing of the trailer in a rearward direction without application of the brakes thereon;

Fig. 6 is a vertical section taken along line VI—VI of Fig. 2 or 5 through the hydraulic brake master cylinder showing its connection to one section of the drawbar;

Fig. 7 is a vertical section taken along line VII—VII of Fig. 5 showing the branch connections from the outlet of the hydraulic brake master cylinder; and Fig. 8 is a side elevation of another embodiment of the automatic brake mechanism of this invention similar to that disclosed in Fig. 1 but employing levers for operating the hydraulic brake master cylinder, and a wedge for preventing its operation when the trailer is to be backed or pushed in a rearward direction by its tractor or towing vehicle.

Referring first to the embodiments disclosed in Figs. 1 through 6, and more particularly to Fig. 1 thereof, there is shown the rear portion of an automobile or a tractor towing vehicle 10 having a rear bumper 11 to which is connected a conventional type of trailer hitch comprising a ball 12 which fits inside a socket 13 connected to the forward end of a drawbar 15. The drawbar 15 in turn is connected to a frame 16 of a trailer 17 having a pair of wheels 18 similar to the wheels on the vehicle 10 and provided with hydraulic brakes 19, which may nilar to the brakes provided on the wheels of the towing vehicle.

Referring now to the specific drawbar mechanism 15 which is incorporated as part of the trailer 17 and connected to the frame 16 thereof, reference is now had more specifically to Figs. 2 through 4 in which the drawbar is shown to be composed of two relatively longitudinally movable sections 21 and 22. The upper section 21 may comprise an inverted U-shaped channel member which may be an extension of the center beam of the frame 16 of the trailer 17. The lower section 22 may comprise upright U-shaped channel member also, which preferably extends beyond the end of the channel member and may have mounted at its outer end between its flanges, the socket portion 13 of the hitch, such as by welding or by bolts 23 as shown in Fig. 2.

The two overlapping portions of the sections 21 and 22 are connected herein by pairs of parallel links 24 and 25 which are connected at their opposite ends to four pivots, each of which pivots extends through the flanges of the channel members 21 and 22 and may comprise bolts 26 and 27, respectively. The shanks of these pivot bolts 26 and 27 may be mounted in bearings 28 and 29 (see Fig. which bearings may be connected to grease injection plugs 30. Since the distance between the axes of the pivots of these links is slightly greater than the vertical distance between the axes of the enlarged apertures 31 and 32 therefor in the sections 21 and 22 when the edges 33 and 34 of their flanges are resting on each other as shown in Fig. 1, there is a collapsible parallelogram type of oscillating movement permitted between the sections 21 and 22 which is longitudinally limited in both directions, forward and rearward, by the contact of the edges 33 and 34 from the position shown in full lines in Fig. 1 to a similar position beyond the dotted line position shown in Fig. 1. In order to avoid loosening of the bolts 26 and 27 by the relative rocking and pivotal movement on the links 24 and 25, one of the pairs of links 24 may be provided with a bolt head or nut locking projection 35, as shown in Figs. 3 and 4, which prevents the bolts from rotating in the links 24 and 25 to limit the wear in the apertures in the links, and better distribute the load and wear along the bearings 28 and 29. If desired, the nuts 36 on the bolts 26 and 27 may be locked in position by other lock nuts or may be lock nuts themselves, so as to avoid being loosened by the rocking movement of the links 25.

Referring next to the brake operating mechanism shown in more detail in Figs. 5, 6 and 7, there may be provided, rearwardly of the section 22 and mounted in a cylindrical enclosure or housing 40 welded in and beneath the flanges of the section 21, a standard hydraulic type brake master cylinder 41 with a cylinder chamber 42 and fluid reservoir 43, which reservoir may be provided with a plug 44 to which access may be had through aligned apertures 45 in the cylindrical chamber 40 and section 21. At the forward end of the housing 40 may be welded a plate 46 to which the master cylinder 41 may be mounted by means of bolts 47 (see Fig. 6).

The master cylinder mounting plate 46 may be provided with an aperture 48 through which the piston rod 50 of the hydraulic cylinder 42 extends to co-operate with an abutment 51, which may be welded to the section 22, which section is movable relative to the section 21 of the drawbar 15. The piston rod 50 may have threaded on its inner end a pair of lock nuts 52, which may be used for adjusting the position of contact of the piston 50 with the abutment 51, and the abutment 51 may be provided with an aperture 53 through which the outer end of the piston may extend and be guided in its movement.

In order to maintain the brake or hydraulic cylinder in non-operative position as shown in Fig. 5, and to overcome unnecessary changes in momentum which may occur due to irregularities of the road and when braking of the trailer is not required, there may be provided a resilient equalizing means, such as a helical spring 55 (see Fig. 5), between the cylinder face of the hydraulic master cylinder 41 or plate 46 and the adjusting nuts 52, which in turn abut against the abutment 51 to urge and normally maintain the sections 21 and 22 of the drawbar 15 toward their longitudinally extending non-braking position as shown in full lines both in Figs. 1 and 5.

From the outlet of the master hydraulic cylinder chamber 42, there are connected several branch ducts from a four-way joint 56 (see Fig. 7), one of which may be connected through a flexible hose or duct 57 to operate the hydraulic brake cylinders in the brakes 19 of the trailer 17, and the other of which may be connected through a duct 58 to operate a hydraulic pressure operated switch to control a stop light 59 mounted on the rear of the trailer 17, and a third may be connected to a by-pass duct 60 containing a solenoid operated valve 61. This valve 61 may be mounted in the housing 40 adjacent the hydraulic master cylinder 41, and be connected through a duct 62 back to the reservoir 43 of the hydraulic master cylinder 41, so that when the valve 61 is opened, hydraulic pressure cannot be transmitted to either the ducts 57 or 58 to apply the brake or light the stoplight 59, but instead operation of the piston 50 will just move the liquid through the valve 61 back into the reservoir 43 without applying the trailer brakes 19.

The operation of the valve 61 by the solenoid 63 may be through an electrical connection or conductor 64 (see also Fig. 1), which may be connected in the circuit for the back-up lights 65 of the vehicle 10, or may be directly connected to a switch (not shown) provided on the gear shift lever inside the vehicle 10, which is operated when the gears are shifted into "reverse."

Although the hydraulic brake master cylinder and two section drawbar mechanism may be adapted to the drawbar of any trailer, the mechanism of this invention also may be made as a separate unit and welded to the end of a cut-off drawbar or frame 16 of any vehicle such as along the weld 66 shown in Figs. 2 and 5. The tongue or section 21 of the drawbar 15 may be reinforced and stabilized with the frame of the trailer 17 by means of triangular angle bracing members 67 which may be welded, such as at their ends 68, to the top face and sides of the channel section 21 as shown in Fig. 2.

If desired, the hydraulic master cylinder 41 may be placed remote from the drawbar 15 and located rearwardly under the trailer 17 as shown in the embodiment in Fig. 8, in which the two sections 71 and 72 of the drawbar 75 (similar to sections 21 and 22 of drawbar 15 in Figs. 1–6) may be connected by links 24 and 25 similar to those disclosed in Figs. 2 and 3. The abutment 81 (similar to abutment 51 in Fig. 5) on the section 72 may then be contacted through an extension rod 82 connected to a pivoted lever 83 and guided by an aperture 84 in a bracket member 85 mounted under the frame 16 of the trailer 17. The member 85 also may provide the fulcrum 86 for the lever 83. Such a lever mechanism has advantages in increasing or reducing the relative movement between the parts 71 and 72 by connecting the end of the piston 50 of the hydraulic master cylinder 41 at a different distance from the fulcrum 86 than that of the connecting rod 82. An equalizing spring 95 (similar to spring 55) may be employed along the rod 82 between abutting nuts 92 and an abutment 93 which may be provided on the section 72 of drawbar 75.

Instead of employing a solenoid valve 61 in a by-pass duct 62 back to the master cylinder reservoir 43 as shown in Fig. 5, to permit backing up for pushing of the trailer instead of pulling it along the drawbar 75, the modification shown in Fig. 8 shows that there may be provided other means, such as wedge 96, which wedge may be inserted between limiting abutting portions 98 and 99 of the sections 72 and 71, respectively, so as to prevent their relative movement and permit backing up of the trailer 17. Such a wedge 96 may be operated by solenoid 97 similar to the solenoid 63, which solenoid may be mounted on the section 72 and connected by conductors 64 to the reversing lever of the vehicle 10.

The operation of the brake mechanism of this invention is automatic, in that the momentum of the trailer 17, which is normally unbraked by the vehicle 10 once it is being pulled, moves freely even after the vehicle 10 has slowed down or decreased its velocity by applying its brakes. This continued movement of the trailer 17 moves the section 21 or 71 of its drawbar 15 or 75, respectively, forwardly or relatively with respect to the other section 22 or 72, so as to cause abutment 51 or 81 to move against the nuts 52 or 22 to compress the spring 55 or 95 and accordingly operate the piston 50 in the hydraulic brake cylinder chamber 42 directly or through the rod 82 and lever 83. The piston 50 in the hydraulic master cylinder 42 then forces the fluid therein through the ducts 57 and 58 to apply the brakes 19 and light the stoplight 59 on the trailer 17. Thus, relative movement between the trailer 17 and the vehicle 10 automatically applies the brakes 19 in a degree depending upon how severe and rapid or abrupt is the change in momentum or stopping of the vehicle 10.

When the vehicle 10 starts to accelerate or pull the trailer 17, the sections 21 and 22, or 71 and 72 of the hitches 15 and 75, respectively, are extended or pulled into their full line positions shown in Fig. 1 so that the spring 55 or 85 will release the pressure in the master brake cylinder chamber 42 to release the brakes 19, and the trailer 17 is then easily and freely pulled by the towing vehicle or tractor 10.

However, if the operator of the vehicle 10 wishes to back up the trailer, such as over a curb, over rough ground, or up a hill, the by-pass solenoid valve 61 in Fig. 5 must be opened, or the wedge 96 must be placed between the sections 71 and 72 according to the mechanism of Fig. 8, to prevent operation of the trailer brakes 19. Either of the solenoids 61 or 97 operating the valve or wedge, respectively, is then operated by placing the vehicle in its reversing gear, without the operator of the vehicle leaving his seat in the vehicle 10, and accordingly the brakes 19 cannot be applied as long as the vehicle 10 is in its reversing gear.

While there is described above the principles of this invention in connection with specific apparatus, it is to be clearly understood that this invention is made only by way of example and not as a limitation to the scope of this invention.

What is claimed is:

1. A momentum operated brake mechanism for a trailer comprising: a draw-bar for said trailer having two parallel overlapping sections relatively longitudinally movable with respect to each other, said sections having complementary U-shaped cross-sections, one of said sections being attached to a tractor for said trailer and the other of said sections being rigidly attached to said trailer, at least one pair of transversely pivoted links connected to said sections, said sections being limited in their relative longitudinal movement by abutment of their overlapping adjacent parallel edges; the pivots for said pivoted links comprising: shafts extending through said sections, radial projecting means from said shafts adjacent at least one of said links, lug means on at least one of said links for engaging said projecting means on each of said shafts for preventing said shafts from turning relative to said links whereby said links and said shafts move as a unit, and bearing means for said shafts extending substantially the width of said sections and substantially the length of said shafts; means on said sections responsive to relative movement between said sections, said responsive means comprising: a hydraulic brake master cylinder having a reservoir, a piston having a rod extending from said cylinder, resilient means normally maintaining said rod in its most extended position, abutment means attached to the other one of said sections having an aperture therein for freely guiding said rod, adjustable means attached to said rod for abutment with said abutments means adjacent said aperture to move said rod and said piston in said brake cylinder to operate the brake mechanism of said trailer; and means to prevent the operation of said responsive means when said trailer is pushed instead of pulled, said operation preventing means comprising a by-pass connection between said hydraulic brake cylinder and said reservoir of said responsive means, and a solenoid valve in said bypass connection operated by a switch controlled by the reversing gear in said tractor.

2. A mechanism according to claim 1 wherein said section which is attached to said tractor is below said other section rigidly attached to said trailer and wherein said hydraulic brake master cylinder is mounted on and below said section rigidly attached to said trailer.

3. A mechanism according to claim 1 including means for lubricating said bearing means.

References Cited in the file of this patent

UNITED STATES PATENTS

| | | |
|---|---|---|
| 1,966,977 | Dyer | July 17, 1934 |
| 2,114,279 | Claus | Apr. 19, 1938 |
| 2,229,499 | Fisette | Jan. 21, 1941 |
| 2,233,994 | Cook | Mar. 4, 1941 |
| 2,281,938 | Klaucke | May 5, 1942 |
| 2,320,585 | Gill et al. | June 1, 1943 |
| 2,394,840 | Buckel | Feb. 12, 1946 |
| 2,513,854 | Fenstermacher | July 4, 1950 |
| 2,662,616 | De Lateur | Dec. 15, 1953 |
| 2,779,443 | Tucker | Jan. 29, 1957 |

FOREIGN PATENTS

| | | |
|---|---|---|
| 519,088 | Canada | Dec. 6, 1955 |
| 1,115,222 | France | Dec. 26, 1955 |